(12) United States Patent
Subramanian

(10) Patent No.: US 6,294,260 B1
(45) Date of Patent: Sep. 25, 2001

(54) IN-SITU FORMATION OF MULTIPHASE AIR PLASMA SPRAYED BARRIER COATINGS FOR TURBINE COMPONENTS

(75) Inventor: Ramesh Subramanian, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/393,417

(22) Filed: Sep. 10, 1999

(51) Int. Cl.$^7$ .................................................. B23B 9/00
(52) U.S. Cl. .................... 428/469; 428/471; 428/472; 428/472.2; 428/937; 416/241 B
(58) Field of Search .................... 428/469, 471, 428/472, 472.2, 937; 416/241 B

(56) References Cited

U.S. PATENT DOCUMENTS

| | | |
|---|---|---|
| 2,869,227 | 1/1959 | Bradstreet . |
| 4,916,022 | 4/1990 | Solfest et al. . |
| 5,238,752 | 8/1993 | Duderstadt et al. . |
| 5,350,599 | 9/1994 | Rigney et al. . |
| 5,562,998 | 10/1996 | Strangman . |
| 5,573,862 | 11/1996 | Gualtieri et al. . |
| 5,683,825 | 11/1997 | Bruce et al. . |
| 5,716,720 | 2/1998 | Murphy . |
| 5,721,059 | 2/1998 | Bamberg et al. . |
| 5,763,107 | 6/1998 | Rickerby et al. . |
| 5,780,110 | 7/1998 | Schaeffer et al. . |
| 5,824,423 | 10/1998 | Maxwell et al. . |
| 5,846,605 | 12/1998 | Rickerby et al. . |

FOREIGN PATENT DOCUMENTS

| | | |
|---|---|---|
| 0389959A1 | 3/1990 | (EP) . |
| 0455451A1 | 4/1991 | (EP) . |
| 2163369 | 12/1971 | (FR) . |
| 07025690 | 1/1995 | (JP) . |

*Primary Examiner*—Blaine Copenheaver
*Assistant Examiner*—Bryant Young

(57) ABSTRACT

A turbine component (10), such as a turbine blade, is provided which is made of a metal alloy (22) and a base, planar-grained thermal barrier layer (28) applied by air plasma spraying on the alloy surface, where a heat resistant ceramic oxide overlay material (32') covers the bottom thermal barrier coating (28), and the overlay material is the reaction product of the precursor ceramic oxide overlay material (32) and the base thermal barrier coating material (28).

9 Claims, 1 Drawing Sheet

IN-SITU FORMATION OF MULTIPHASE AIR PLASMA SPRAYED BARRIER COATINGS FOR TURBINE COMPONENTS

GOVERNMENT CONTRACT

The Government of the United States of America has rights in this invention pursuant to Contract DE-AC05-95OR22242, awarded by the United States Department of Energy.

BACKGROUND OF THE INVENTION

1. Field of the Invention

This invention relates generally to the field of thermal barrier coatings, and more particularly to a thermal barrier coating for a very high temperature application such as a combustion turbine engine. In particular, this invention relates to the field of multiphase ceramic thermal barrier coatings for high temperature application for coating superalloy components of a combustion turbine.

2. Background Information

The demand for continued improvement in the efficiency of combustion turbine and combined cycle power plants has driven the designers of these systems to specify increasingly higher firing temperatures in the combustion portions of these systems. Although nickel and cobalt based "superalloy" materials are now used for components in the hot gas flow path, such as combustor transition pieces and turbine rotating and stationary blades, even these superalloy materials are not capable of surviving long term operation at temperatures sometimes exceeding 1,200° C.

Examples of cobalt or nickel based superalloys are, for example, Cr.Al.Co.Ta.Mo.W which has been used for making SC turbine blades and vanes for gas turbines, as taught, for example, in U.S. Pat. No. 5,716,720 (Murphy).

These turbine components are generally protected by a basecoat of MCrAlY, where M is selected from the group of Fe, Co, Ni, and their mixtures, as taught for example, by U.S. Pat. Nos. 5,763,107 and 5,846,605 (both Rickerby et al.) and by U.S. Pat. Nos. 4,916,022; 5,238,752; 5,562,998; and 5,683,825 (Solfest et al.; Duderstadt et al.; Strangman; and Bruce et al., respectively). These basecoats are usually covered by an aluminum oxide layer and a final thermal barrier coating ("TBC"). The standard thermal barrier coating, however, is made from yttria-stabilized zirconia, ceria-stabilized zirconia, scandia-stabilized zirconia or non-stabilized zirconia, as taught, for example, by U. S. Pat. No. 5,780,110 (Schaeffer et al.). A particularly useful state of the art TBC is 8 wt. % yttria stabilized zirconia ("8YSZ").

Many of the ceramic thermal barrier layers are deposited as a columnar structure in the direction of the coating layer thickness, as taught in Murphy U.S. Pat. No. 5,716,720. This structure can be formed by plasma assisted physical vapor deposition or electron beam physical vapor deposition, as taught, for example, in Rickerby et al. U.S. Pat. No. 5,846,605 and in Murphy U.S. Pat. No. 5,716,720, respectively.

Another type of ceramic thermal barrier is deposited as a flat layer parallel to the surface of the superalloy structure, and applied, for example, by plasma spraying techniques, as taught in U.S. Pat. 5,824,423 (Maxwell et al.). The Rickerby et al., U.S. Pat. No. 5,846,605 characterizes these type of coatings as having a "brick wall" microstructure which has poor erosion resistance but a lower thermal conductivity than columnar structures.

Much of the development in this field of technology has been driven by the aircraft engine industry, where turbine engines are required to operate at high temperatures, and are also subjected to frequent temperature transients as the power level of the engine is varied. A combustion turbine engine installed in a land-based power generating plant is also subjected to high operating temperatures and temperature transients, but it may also be required to operate at full power and at its highest temperatures for very long periods of time, such as for days or even weeks at a time. Prior art insulating systems are susceptible to degradation under such conditions at the elevated temperatures demanded in the most modern combustion turbine systems.

Modern gas turbine engines can achieve higher efficiencies by increasing the turbine inlet temperatures. This subjects the TBCs to high temperatures. TBC materials that are phase stable at high temperatures upon long term exposure will be required. The current state-of-the-art air plasma sprayed ("APS") 8YSZ coatings destabilize above approximately 1200° C. In addition, the long term high temperature exposure leads to potential sintering and loss of strain compliance, and possible premature TBC failure. 8YSZ coatings are also susceptible to corrosion upon exposure to contaminants in the fuel and erosion due to foreign object damage. Therefore, some of the key requirements for new TBC candidates for high temperature applications are high temperature phase stability, a reduced tendency to sinter, good corrosion and erosion resistance, all of them to be maintained upon long term exposure. These requirements are in addition to the primary needs of a TBC, such as, a low thermal conductivity with minimal coefficient of thermal expansion mismatch with the superalloy substrate. Further advances in gas turbine operating temperatures therefore require a plasma sprayed ceramic thermal barrier coating capable of surface temperature in excess of 1200° C.

SUMMARY OF THE INVENTION

Therefore, it is a main object of this invention to provide an improved thermal barrier coating for use on underlayers, such as alumina and MCrAlY, protecting turbine components, such as superalloy turbine blade assemblies that can operate over 1200° C.

These and other objects of the invention are accomplished by providing a turbine component comprising a metal alloy substrate and a flat thermal barrier coating on and parallel to the substrate surface, the thermal barrier coating comprising (a) a planar-grained ceramic oxide structural base material layer with open porosity and microcracks generally parallel to the surface of the substance and (b) a heat resistant ceramic oxide overlay covering the top surface of the planar-grained base material and infiltrating the open porosity and microcracks of the base, where the ceramic oxide overlay comprises the reaction product of a ceramic oxide overlay precursor material and the ceramic oxide base structure. The ceramic oxide overlay precursor material consists essentially of the composition $C_zO_w$. The ceramic oxide base structure consists essentially of the composition $(A,B)_xO_y$, where A and B are preferably selected from the group consisting of Al, Ca, Mg, Zr, Y, Sc and rare earth elements where rare earth elements are selected from La, Ce, Pr, Nd, Pm, Sm, Eu, Gd, Dy, Ho, Er, Tm and Yb, which will react as oxides with $C_zO_w$. C also is selected from the group consisting of Al, Ca, Mg, Zr, Y, Sc and rare earth elements where rare earth elements are selected from La, Ce, Pr, Nd, Pm, Sm, Eu, Gd, Dy, Ho, Er, Tm and Yb, that will react as oxides with $(A,B)_xO_y$. Preferably, C can be any A or B compound not used as A or B, but C is preferably Al, that is if A=Ca and B=Mg then C should not be Ca or Mg.

The preferred precursor material is a thin coating of alumina, $Al_2O_3$ and the preferred base material is yttria stabilized zirconia where yttria, $Y_2O_3$, content can range from dopant amounts of 10 wt %–20 wt % of the total up to 60 wt % of the total with zirconia $ZrO_2$. The base structure is one of a series of microfissures, microcracks, and splat boundaries all generally parallel to the super alloy top surface and disposed throughout the coating. The reaction product can be prompted upon heating to about 1200° C. to 1500° C. and has the composition, in this preferred case, of a material comprising $Y_3Al_5O_{12}$. Another preferred material is the use of rare earth oxide stabilized zirconia, and an oxide such as $Al_2O_3$ to form a reaction product containing ReO and $Al_2O_3$, for example, $Re_3Al_5O_{12}$.

The invention also resides in a method of making a turbine component having a coated, adherent flat thermal barrier coating on its surface comprising the steps of: (a) providing a nickel or cobalt based superalloy substrate having a flat top surface; (b) depositing a planar-grained ceramic oxide base thermal barrier layer comprising stabilized zirconia, where the thermal barrier layer comprises discrete flat sections with microcrack volumes between the sections, all generally parallel to the flat top surface of the superalloy substrate; (c) separately depositing a precursor oxide overlay material over the base thermal barrier layer, which precursor oxide overlay is capable of reacting with the stabilized zirconia of the thermal barrier layer; and (d) prompting a reaction between the precursor oxide overlay material and the thermal barrier layer to provide a heat resistant overlay material reaction product which coats the thermal barrier layer and infiltrates to the microcrack volumes and fills said volumes. Usually, the reaction is prompted by heating the substrate before service or when the component is in service. The precursor oxide overlay material consists essentially of the composition $C_zO_w$, where C is selected from the stable oxides previously listed that will react with the stabilized zirconia of the thermal barrier layer. Also, one can apply the TBC and overlay precursor onto a hot substrate operating as a heat sink with enough heat to prompt formation of the overlay reaction product.

The reaction product exterior overlays of the invention are a continuous layer completely covering the TBC. They are phase stable and strain tolerant up to temperatures higher than 1400° C. for very long term exposures and provide additional benefits of erosion and corrosion resistance. Also, the invention described here can readily be adapted to current production sequences with an additional step of chemical vapor deposition or other infiltration processes of the overlay coating by a non-line-of-sight process. The coating process is economically feasible and thus has an opportunity for ease of transfer of the technology to production.

Usually, the thermal barrier will be disposed upon an alumina coated MCrAlY type alloy layer covering an alloy turbine substrate; where M ("metal") is selected from the group consisting of Fe, Co, Ni and mixtures thereof. The turbine component can be a turbine blade, a turbine vane, combustors, transitions, ring segments or the like, of a high temperature gas turbine. The reaction product of this invention can perform any or all of the following functions: a sintering inhibitor between splat boundaries, pores, and microcracks within the TBC, a low thermal conductivity coating, an erosion resistant coating, and a corrosion resistant coating.

BRIEF DESCRIPTION OF THE DRAWINGS

The above and other advantages of this invention will be more apparent from the following description in view of the drawings in which.

DESCRIPTION OF THE PREFERRED EMBODIMENT

Figure 1:
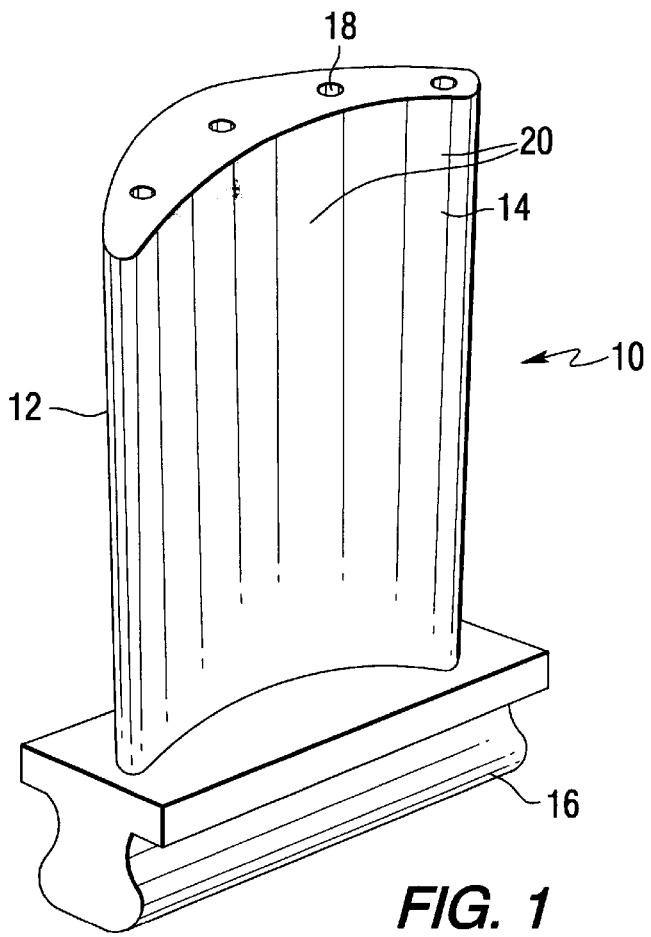
FIG. 1 is a perspective view of a turbine blade having a thermal barrier coating thereon.

Referring now to FIG. 1, one component of a turbine is shown. Turbine blade 10 has a leading edge 12 and an airfoil section 14 against which hot combustion gases are directed during operation of the turbine and which is subject to severe thermal stresses, oxidation and corrosion. The root end 16 of the blade anchors the blade. Cooling passages 18 may be present through the blade to allow cooling air to transfer heat from the blade. The blade itself can be made from a high temperature resistant nickel or cobalt based superalloy, such as a combination of Ni. Cr.Al.Co.Ta.Mo.W, or more specifically a composition of, for example, by weight, 10% Co, 8.4% Cr, 0.65%, Mo, 10% W, 3.3% Ta, 1.05% Ti, 5.5% Al, and 1.4% Hf, with minor amounts of Zr, C, an dB in a Ni matrix (commercially known as "MAR-M247 alloy").

The thermal barrier coating 20, comprising a base layer 28 and one or more overlays 32, would cover the body of the turbine blade. Use of the coating on the turbine blade of FIG. 1 is only illustrative. The coating can be used on other components of turbines used with generators, such as, turbine vanes, buckets, nozzles, or the like, or upon any substrate made of, for example, metal or ceramic, where thermal protection is required.

Figure 2:
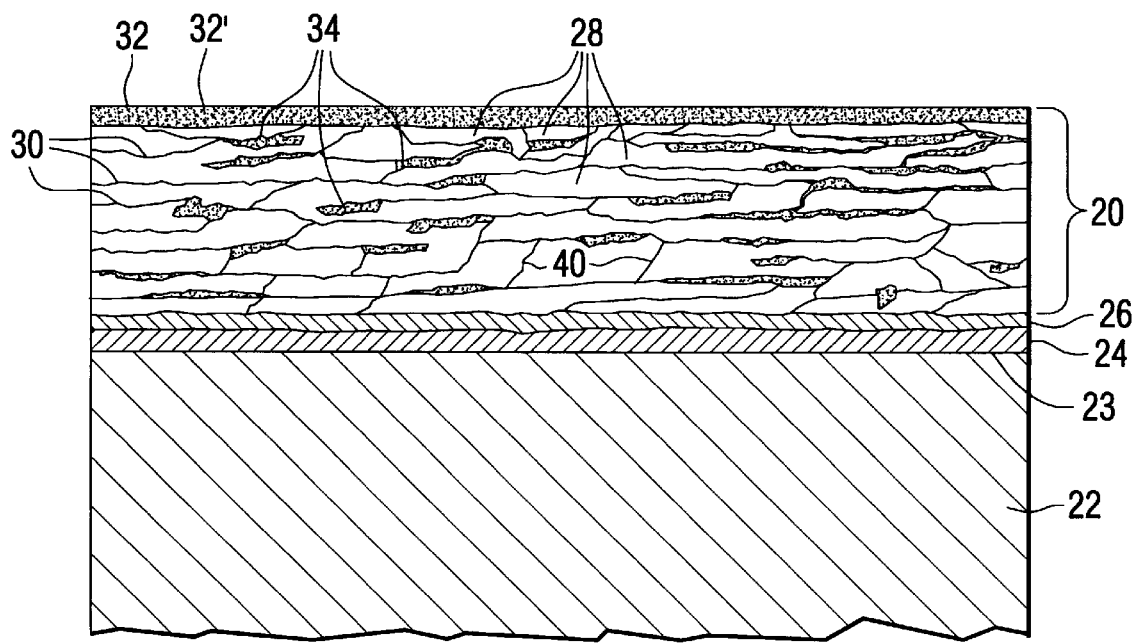
FIG. 2, which best shows the invention, is a fragmented sectional view through a turbine component, such as the turbine blade of FIG. 1, showing the discrete parallel-grain structure, and parallel microcracks resulting from air plasma spraying, and a top reaction product after heat treatment.

FIG. 2 shows an example of a possible coating system for protection of a turbine component substrate 22 such as the superalloy core of a turbine blade. A metallic bond layer 24 of a MCrAlY type alloy can be used as a first parallel layer on the substrate, where M ("metal") in the alloy is selected from the group of Ni, Co, Fe and their mixtures, and Y can include yttrium Y, as well as La and Hf. This bond layer can be applied by sputtering, electron beam vapor deposition or low pressure plasma spraying, to provide a dense, relatively uniform layer about 0.002 cm to 0.0245 cm (0.001 inch to 0.01 inch) thick. This layer can subsequently be polished to provide a smooth finish. One purpose of this layer is to allow an oxide scale 26 predominantly alumina to form, in order to further protect the substrate 22 from oxidative attack. The scale layer 26 also provides a good bonding surface for the exterior, top coat, ceramic thermal barrier coating 20 which is shown in FIG. 2, where the base layer is deposited by air plasma spraying ("APS"). Such a base layer microstructure 28 is well known in the art when "APS" spraying is used and is hereto referred to as "APS microstructure". Such a planar or horizontal grain structure has discreet splat boundaries and intersplat cracks 30, generally parallel to the top surface 23 of the superalloy substrate 22 with associated pore volumes 34 infiltrated with material from parallel overlay coating layer 32. The splat boundaries and intersplat cracks 30 would also be infiltrated, usually by capillary action, with the material from overlay coating layer 32. The microstructure of the base thermal barrier layer 28 consists of solidified splats of the molten ceramic with microcrack volumes within each of the splats. Pores and inter-splat cracks are formed during the deposition process. The strain tolerance of the coating results due to these splat boundaries and microcracks within the splats.

Various combinations of underlayers 24 and 26 can be used within he scope of this invention and in some instances, the thermal barrier coatings 20 of this invention can be directly deposited on the substrate 22. The ceramic thermal barrier can be applied by any method providing good adherence in a thickness effective to provide the required thermal protection for the substrate 22, usually in the order of about 50 micrometers to about 350 micrometers. Preferably, the ceramic thermal barrier layer is applied by APS, which involves spraying the stabilized zirconia powders after passing them through a plasma gun.

Multiphase TBC systems possess a unique set of properties, which the individual constituents may not provide. The candidate TBC system consists of materials and/or phases that have formed as a result of a reaction between two or more materials that have been deposited on to the component substrate. The materials are selected based on their phase stability and possible reaction products between them. The reaction products to provide TBC 20 of FIG. 2 are selected such that they are phase stable to high temperatures, possess low thermal conductivity and have a low tendency to sinter. In addition, the reaction product can be selected to provide improved corrosion and erosion resistance.

FIG. 2 illustrates a multiphase TBC system as processed by the approach described in this invention. A TBC 20 is deposited on to a MCrAlY coated superalloy substrate via an APS process. It has a non-columnar typical APS microstructure layer 28 and the chemical formula denoted by $(A,B)_xO_y$. This layer is the underlying TBC. Ceramic overlay 32 is deposited as a precursor coating on top of the underlying TBC layer shown as 28, and is denoted as $C_zO_w$, hereafter referred to as the overlay. This precursor overlay 32 can be deposited by processes which allow for its deposition on top of the TBC layer and also its infiltration in between the grains, such as by a chemical vapor deposition technique or a sol-gel technique or combinations thereof. According to this invention, the two materials, $(A,B)_xO_y$, and $C_zO_w$ react to form a new overlay phase/material on the top surfaces of the TBC layer. Thus, precursor overlay 32 is transformed into 32', generally after heating the part enough to induce reaction. The exact composition of the TBC and the overlay is dependent on the phase stability of the two reactant materials and the final reaction product desired at the surface temperature during service.

Due to the formation of the desired coating at the surface by a chemical reaction, the reaction product 32' will be in thermodynamic equilibrium with the coating and would not completely dissolve completely into the TBC layer upon long term service at high temperatures. This ensures the stability of the multiphase TBC for long periods at high temperatures. The thickness of the final reaction product overlay 32 coating can vary between 0.0002 micrometer (2 Angstrom Units), to about 10 micrometers.

Generally the temperature of the TBC decreases across the thickness of the TBC from the top outside surface to the substrate. If the multiphase TBC is required only where the temperatures are highest, then the infiltration depth of the C.O. coatings would have to be controlled. Modification of the deposition parameters can control the depth of infiltration of the coating and consequently, the depth of the reaction product across the thickness of the TBC. The depth of the infiltration would also depend on the variation of the open porosity from the free surface to the coating/substrate interface. The thickness of the underlying TBC and the overlay coating can be modified to obtain a specific thickness and volume of the reaction product. The total thickness of the final multiphase TBC system 20 will range from 0.0112 cm to 0.254 cm (5–100 mils).

Although the multiphase TBC system should possess a high thermal expansion, the reaction products need not have a high thermal expansion. The thermal expansion mismatch between the reaction product and the underlying APS TBC can be allowed to be sufficiently high to introduce cracks in the reaction product due to coefficient of thermal expansion mismatch stress. This is beneficial in breaking up any bonds that may have formed during sintering. The overlay coatings can be deposited by electron beam evaporation, air plasma spray, chemical vapor deposition and sol-gel techniques or combinations of the processes.

An example of how this process would work would be to subject a standard turbine component having a Ni-based superalloy substrate, a MCrAlY bond coat and an alumina top coat to standard APS deposition to provide a ceramic, YSZ coating, that is, zirconia stabilized with yttria ($Y_2O_3$). This would provide a layer 28 with microcracks 30 generally parallel to the substrate. A precursor overcoat 32 would then be deposited over the APS TBC via well known chemical vapor deposition techniques, or sol-gel techniques.

The coated TBC and substrate could then be heated to temperatures which would initiate a reaction between the precursor $Al_2O_3$ and the APS TBC, to provide a material containing major amounts of $Y_3Al_5O_{12}$, a yttrium aluminum garnet as the finalized overcoat material, with the underlying material as yttrium stabilized zirconia.

This multiphase TBC system would have a unique combination of low thermal conductivity, high thermal expansion, long term phase stability and good strain compliance. The high thermal expansion, low thermal conductivity and long term phase stability would be provided by the yttria stabilized zirconia. The presence of $Y_2O_3$ in the stabilized zirconia would aid in the sintering of the TBC, but due to its presence the strain compliance of the coating would be expected to be somewhat compromised. This would be is alleviated by the formation of the reaction product, YAG. YAG has a low thermal conductivity—lower than 2–3 W/mK at temperatures higher than 1000° C. This multiphase TBC system is expected to meet the requirements of TBCs for use at very high temperatures for long term exposure.

The thermal barrier coating reaction product between base $(A,B)_xO_y$ and one or more overlay coatings acts as at least one of a sintering inhibitor, a corrosion resistant coating, an erosion resistant coating, and a low thermal conductivity coating.

What is claimed is:

1. A turbine component comprising a metal alloy substrate and a flat thermal barrier coating on and parallel to the substrate surface, the thermal barrier coating having (a) a planar-grained ceramic oxide base material with open porosity and microcracks generally parallel to the surface of the substrate and (b) a heat resistant ceramic oxide overlay covering the top surface of the planar-grained base material and infiltrating the open porosity and microcracks of the base material, where the ceramic oxide overlay comprises the reaction product of a ceramic oxide precursor material and the ceramic oxide base material.

2. The turbine component of claim 1, where the ceramic oxide overlay precursor material consists essentially of the composition $C_zO_w$, and the ceramic oxide base structure consists essentially of the composition $(A,B)_xO_y$, where A and B are selected from stable oxides which will react with $C_zO_w$ and C is selected from stable oxides that will react with $(A,B)_xO_y$, where A, B and C are selected from the group consisting of Al, Ca, Mg, Zr, Y, Sc and rare earth elements selected from La, Ce, Pr, Nd, Pm, Sm, Eu, Gd, Th, Dy, Ho, Er, Tm and Yb.

3. The turbine component of claim 2, where the thermal barrier coating is the reaction product of the base structure $(A,B)_xO_y$, and one or more overlay coatings.

4. The turbine component of claim 1, where the thermal barrier layer is deposited by air plasma spraying.

5. The turbine component of claim 4, where the reaction product is formed by heating the ceramic oxide precursor overlay coating material and the underlying air plasma sprayer thermal barrier layer to a temperature sufficient to induce reaction.

6. The turbine component of claim 1 where the substrate is a superalloy.

7. The turbine component of claim 1, where the reaction product comprises $Y_3Al_5O_{12}$.

8. The turbine component of claim 1, where the thermal barrier layer acts as at least one of a sintering inhibitor, a corrosion resistant coating, an erosion resistant coating, and a low thermal conductivity coating.

9. The turbine component of claim 1, where the component is selected from the group of turbine blades, turbine vanes, combustors transitions and ring segments.

* * * * *